Sept. 10, 1968       G. D. COBAUGH ET AL       3,401,053
                      FURNACE CONSTRUCTION
                      Filed Oct. 12, 1965

INVENTORS:
BERHL E. WISHON,
DONALD F. STOCK &
BY GEORGE D. COBAUGH

*William C. Walm*

ATTORNEY

United States Patent Office 3,401,053
Patented Sept. 10, 1968

3,401,053
FURNACE CONSTRUCTION
George D. Cobaugh and Donald F. Stock, Pittsburgh, and Berhl E. Wishon, Bethel Park, Pa., assignors to Dresser Industries, Inc., a corporation of Delaware
Filed Oct. 12, 1965, Ser. No. 495,270
1 Claim. (Cl. 117—125)

ABSTRACT OF THE DISCLOSURE

Insulating structure comprised of refractory insulating brick of the soft type, containing a brush coating over one or more surfaces thereof, the coating consisting of a mixture of refractory material and orthophosphoric acid.

---

It is conventional to use various types of insulating materials, including insulation brick, to protect metal apparatus parts from the deleterious effects of high temperatures. An insulating brick, normally called a "refractory insulation brick," consists of earth oxide materials; for example, fire clay. High alumina and basic refractory materials are also used. Such brick are quite porous in order to obtain good insulating properties; but, unfortunately, many of them are quite soft. By this we mean to describe a chalk or plaster-like physical state which is easily scratched or dug with a fingernail. Of course, there are some refractory insulating brick which are quite hard but this type of brick is just too expensive, usually, to be economically feasible in relatively low temperature environments of the type we are concerned with.

In heat exchangers of the type above described, the gas or air stream is usually less than about 1500° F. and probably in the 1200° F. range. Even though the softer variety of refractory insulating brick is quite adequate as far as refractoriness goes, its physical state, most distressingly, makes it extremely susceptible to abrasion by heat exchanger gas streams. It is therefore an object of this invention to provide for construction for a heat exchanger or the like using the soft variety of refractory insulating brick, which are treated to provide an extremely hard and thermally stable exterior surface substantially inert both chemically and physically to heat exchanger gas streams.

Briefly, according to one aspect of this invention, there is provided insulating structure in a heat exchanger, which structure resists the destructive effects of high velocity, high temperature, heat exchanger gas streams. The insulating structure is comprised of a plurality of refractory insulating brick of the softer type which have had their outer surfaces, or at least those surfaces to be exposed to a gas stream, treated to provide an extremely hard and integral, abrasion and temperature-resistant outer face. This face is formed by brush coating a selected phosphoric acid-containing, paste-like slurry over exposed surfaces of the brick, which brick are thereafter heat-treated to form the very hard and integral zone over the exterior surfaces of said brick.

Other objects and further features and advantages of the invention will become apparent from the following detailed description with reference to the attached drawings. In these drawings.

Figure 1:
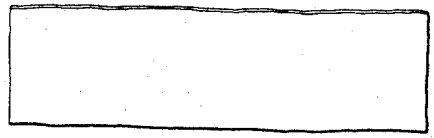
FIG. 1 is a schematic side elevation of a brick according to this invention.

The drawings are schematic renditions of what actual brick looked like after testing.

The coating material which is used in the practice of the present invention consists essentially, by weight, of 10–25% (preferably 15 to 25%) of orthophosphoric acid of 75% concentration (or the equivalent thereof as hereinafter defined), the remainder being material selected from the group consisting of high alumina materials and zircon. We prefer that at least 5% of this remainder be high alumina material. Tempering fluids, such as water or the like, which are compatible with the foregoing can be added to increase workability. Instead of the orthophosphoric acid of 75% concentration, any other acid or phosphate compound which provide an equivalent amount of $P_2O_5$ can be used.

Representative high alumina materials which may be used (and which may be either calcined or uncalcined) include bauxite, alumina, calcined diaspore, or minerals of the kyanite-sillimanite group. Generally, alumina materials, for the purpose of this invention, have an analysis of at least about 45 or 50 weight percent $Al_2O_3$ and, preferably, at least 60%. Usable zircon is that, for example, derived from beach sands. Generally, such zircon averages over 95%, by weight, of $ZrO_2 \cdot SiO_2$, and the remainder is composed of alumina, titania, iron oxide, calcium oxide, magnesium oxide, or the like.

Exemplary analyses of preferred materials in weight percent are typically as follows:

| | Calcined bauxite, percent | Calcined alumina, percent | Crude clay, percent | Zircon, percent |
|---|---|---|---|---|
| $SiO_2$ | 6.2 | 0.03 | 55.4 | 32.3 |
| $Al_2O_3$ | 89.0 | 99.5 | 20.8 | 1.0 |
| $TiO_2$ | 3.1 | 0.3 | 1.2 | 0.2 |
| $Fe_2O_3$ | 1.5 | 0.2 | 2.6 | 0.2 |
| CaO | | 0.08 | 0.1 | 0.16 |
| MgO | | 0.03 | 0.6 | 0.04 |
| Alkalies | 0.2 | Trace | 2.3 | |
| Ignition Loss | | | 7.0 | |
| $ZrO_2$ | | | | 66.1 |

It should be noted also that the coating composition is free of vitrifiable components; that is, free of components which will melt to form an amorphous phase (glass) at temperatures of use. For example, the coating composition is substantially free of materials which will glassify or vitrify at temperatures of less than about 1500° F. All components are −28 mesh.

An exemplary "soft" refractory insulating fire brick which can be used in the practice of the present invention has approximately the following chemical analysis on an oxide basis, weight percentage:

| | Percent |
|---|---|
| $SiO_2$ | 44.8 |
| $Al_2O_3$ | 38.3 |
| $TiO_2$ | 1.4 |
| $Fe_2O_3$ | 0.5 |
| CaO | 14.7 |
| MgO | 0.1 |
| Alkalies ($Na_2O + K_2O + Li_2O$) | 0.2 |

This exemplary brick has a bulk density of about 29 to 32 pounds per cubic foot. Its cold crushing strength in pounds per square inch is quite low; for example, in the range 130–180. Its modulus of rupture, also in pounds per square inch, is relatively low, being in the range 110–170.

A second example of usable "soft" brick is one having the following chemical analysis:

| | Percent |
|---|---|
| $SiO_2$ | 50.8 |
| $Al_2O_3$ | 46.1 |
| $TiO_2$ | 1.4 |
| $Fe_2O_3$ | 1.0 |
| CaO | 0.3 |
| MgO | 0.1 |
| Alkalies ($Na_2O+K_2O+Li_2O$) | 0.3 |

This brick has a somewhat higher bulk density than the first one discussed, in the range 51–55 pounds per cubic foot. Its cold crushing strength and modulus of rupture are somewhat greater; for example, 200–350 pounds per square inch cold crushing strength and 200–350 pounds per square inch in a modulus of rupture test.

In our test program we used brick of both of the foregoing types and treated them with a variety of different coating materials. For purposes of describing this test work, we refer to brick of the type first discussed above as Brick A and those of the second type as Brick B.

Two comparative coating materials tested were silicate bonded; that is, instead of the phosphoric acid used in the preferred composition discussed above, sodium silicate was the bonding agent. A first of the coating compositions which we refer to as Type X hereafter had an alumina content of about 44% and a silica content of about 48%, the remainder being the various subsidiary oxides normally associated with high alumina and fireclay materials. A second comparative coating composition had a somewhat higher alumina content, i.e., about 50%, and a silica content of about 45%. We refer to this as Type Y.

In our test work, Type A brick were "brush coated" with a coating of the phosphate-bonded type, identified above. By "brush coating" we mean to describe a very thin layer as would be expected when using a paint brush to apply it. The precise thickness of the coating is thus not definitely measurable. Its thickness, though, is roughly comparable to perhaps two coatings of ordinary house paint. Two sets of such brush-coating brick were made. Some of them were dried at about 250° F. and others at about 500° F. The coated brick were assembled as a panel in an electric furnace where they were subjected to temperatures in excess of 1200° F. After the test, no cracking or peeling of the treated surface could be observed. The coatings were very well adhered and seemed to have reacted and integrated with surface areas of the brick. The surfaces were extremely hard. Such a brick is of the type shown schematically in FIG. 1.

Figure 4:
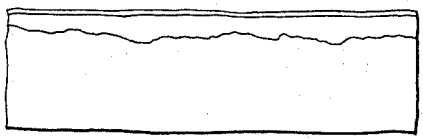
FIG. 4 is a schematic diagram of a brick of the type shown in FIG. 1 in which the coating was not properly applied.

In a comparative test, the phosphate coating material was trowelled on the exposed surfaces of a group of Type A insulating refractory brick. The coating was uniform in thickness, approxiamtely 1/16" in depth. Some of these brick were dried at 250° F. and others at 500° F. After drying, the brick exhibited slight cracking below the mortared surface. Those dried at 500° F. showed even more severe separation. Some of them showed a separation of treated surface and adhering brick approximately 1/2" below the treated surface. See FIG. 4.

Figure 2:
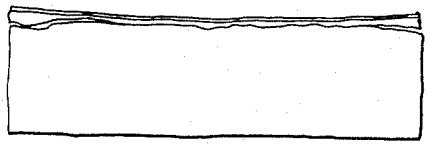
FIG. 2 is a schematic view of a brick of the type shown in FIG. 1 using a comparative coating material.
Figure 3:
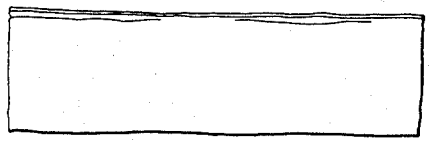
FIG. 3 is a schematic diagram of brick of the type shown in FIG. 1 using another comparative coating material.

Still using the Type A brick, the two silicate-bonded coating compositions were tested. Type X coating composition, the high alumina one, after being exposed to elevated temperature was severely damaged. The coated surface had pulled away taking a considerable amount of the body of the brick with it. See FIG. 2. Type Y silicate-bonded mortar also showed pulling away from the body of the brick, but it did not seem to pull brick material with it. See FIG. 3. At substantially the same temperature, brick treated according to our invention (as depicted in FIG. 1) successfully passed the test without breakdown.

Type B refractory insulating brick were also tested using the same three types of coating composition which had been applied to the Type A brick. The results were comparable. Type X silicate-bonded coating composition showed peeling away of the coating, and it seemed to carry some of the body of the brick with it. The Type Y (the high aluminum coating) composition separated from the brick, although not as severely as it had in the case of Brick A. Where the coating pulled away, minor amounts of the brick body could be seen adhering. Our preferred coating composition was satisfactory in all respects on the Type B brick.

Having thus described the invention in detail and with sufficient particularity as to enable those skilled in the art to practice it, what is desired to have protected by Letters Patent is set forth in the following claim.

We claim:
1. Insulating structure of the type used in heat exchangers and the like arranged for direct contact with high velocity and high temperature gas streams, comprised of a plurality of refractory insulating brick of the soft type, there being a brush coating over all surfaces of said shapes, said coating being exposed to said high velocity gas streams, said brush coating being of a material of the type consisting essentially of the equivalent of 15–25% of orthophosphoric acid of 75% concentration, the remainder of the coating material being material selected from the group consisting of high alumina materials and zircon, said coating composition being substantially free of constituents which will vitrify at temperatures of use, said brush coating being in a hard set condition firmly bonded to covered surface areas of said soft brick and providing a substantially gas-impervious surface thereover.

References Cited

UNITED STATES PATENTS 3,269,857   8/1966   Stavrolakis et al. __ 117—123 XR

ALFRED L. LEAVITT, *Primary Examiner.*

W. F. CYRON, *Assistant Examiner.*